(12) United States Patent
Hernández

(10) Patent No.: US 11,097,815 B2
(45) Date of Patent: Aug. 24, 2021

(54) VESSEL FOR CLEANING WASTE IN SHALLOW WATERS

(71) Applicant: Manuel Villalba Hernández, Saragossa (ES)

(72) Inventor: Manuel Villalba Hernández, Saragossa (ES)

( * ) Notice: Subject to any disclaimer, the term of this patent is extended or adjusted under 35 U.S.C. 154(b) by 0 days.

(21) Appl. No.: 16/624,885

(22) PCT Filed: Jun. 18, 2018

(86) PCT No.: PCT/ES2018/070429
§ 371 (c)(1),
(2) Date: Dec. 19, 2019

(87) PCT Pub. No.: WO2018/234601
PCT Pub. Date: Dec. 27, 2018

(65) Prior Publication Data
US 2020/0130787 A1    Apr. 30, 2020

(30) Foreign Application Priority Data

Jun. 19, 2017   (ES) .............................. ES201730731U

(51) Int. Cl.
*B63B 35/32*       (2006.01)
*E02B 15/10*       (2006.01)
(Continued)

(52) U.S. Cl.
CPC .............. *B63B 35/32* (2013.01); *A01D 44/02* (2013.01); *E02B 15/10* (2013.01); *E02B 15/104* (2013.01);
(Continued)

(58) Field of Classification Search
CPC ...... A01D 44/00; A01D 44/02; E02B 15/046; E02B 15/10; E02B 15/104; B63B 17/0036; B63B 35/32
(Continued)

(56) References Cited

U.S. PATENT DOCUMENTS 727,807 A * 5/1903 King ..................... A01D 44/00
56/8
1,795,003 A * 3/1931 Allen ..................... A01D 44/00
56/9

(Continued)

FOREIGN PATENT DOCUMENTS

CN       2388224 Y    7/2000
CN       2749243 Y    1/2006
(Continued)

OTHER PUBLICATIONS

International Search Report, dated Nov. 5, 2018 for corresponding International Application No. PCT/ES2018/070429 with English translation.
(Continued)

*Primary Examiner* — Christopher Upton
(74) *Attorney, Agent, or Firm* — Intellectual Property Law Group LLP

(57) ABSTRACT

The invention relates to a boat (1) for servicing shallow canals, lakes, and rivers configured for extracting, cutting, grinding, and casting plant waste, solid waste, or agricultural plantation harvest and sending what is harvested to shore, and comprising an extractor belt (3) configured for extracting the plant waste which is deposited on a horizontal conveyor belt (9) to a grinding mill (4); and further comprising at least one drive turbine (5) and a directional stack (6).

5 Claims, 1 Drawing Sheet

(51) Int. Cl.
  *A01D 44/02* (2006.01)
  *B63B 3/62* (2006.01)
  *B63B 17/00* (2006.01)
  *B63B 17/06* (2006.01)
  *B63B 27/22* (2006.01)
  *B63B 49/00* (2006.01)

(52) U.S. Cl.
  CPC ............. *B63B 3/62* (2013.01); *B63B 17/0036* (2013.01); *B63B 17/06* (2013.01); *B63B 27/22* (2013.01); *B63B 49/00* (2013.01); *B63B 2213/02* (2013.01)

(58) Field of Classification Search
  USPC ..... 210/170.05, 170.09, 170.1, 242.1, 242.3, 210/747.6, 776; 56/8, 9
  See application file for complete search history.

(56) References Cited

U.S. PATENT DOCUMENTS

| | | | | |
|---|---|---|---|---|
| 3,540,194 | A * | 11/1970 | Chaplin | A01D 44/00 56/9 |
| 3,613,891 | A * | 10/1971 | Cloutier | E02B 15/104 210/242.3 |
| 3,700,108 | A * | 10/1972 | Richards | E02B 15/104 210/242.3 |
| 3,756,294 | A * | 9/1973 | Rainey | B63B 25/082 210/242.3 |
| 4,258,534 | A * | 3/1981 | Bryant | A01D 44/00 56/9 |
| 4,582,014 | A | 4/1986 | Patel | |
| 4,976,855 | A * | 12/1990 | Virtanen | E02B 15/048 210/242.3 |
| 5,083,417 | A * | 1/1992 | Jeronimidis | A01D 44/00 56/9 |
| 5,197,263 | A * | 3/1993 | Midtling | A01D 44/00 56/9 |
| 5,215,654 | A * | 6/1993 | Karterman | E02B 15/046 210/242.3 |
| 5,487,258 | A * | 1/1996 | McNabb | A01D 44/00 56/9 |
| 6,116,004 | A * | 9/2000 | Penny | A01D 44/00 56/8 |
| 6,328,165 | B1 * | 12/2001 | Baker | A01K 79/00 56/8 |
| 2006/0065586 | A1 * | 3/2006 | Walczyk | B63B 35/32 210/242.1 |
| 2012/0055856 | A1 * | 3/2012 | Ratti | E02B 15/104 210/242.1 |
| 2013/0213897 | A1 * | 8/2013 | Jauncey | E02B 15/046 210/170.05 |

FOREIGN PATENT DOCUMENTS

| | | |
|---|---|---|
| EP | 0325091 A1 | 7/1989 |
| EP | 2305558 A1 | 4/2011 |
| WO | WO2012101304 A1 | 8/2012 |

OTHER PUBLICATIONS

Written Opinion of the ISA, dated Nov. 5, 2018 for corresponding International Application No. PCT/ES2018/070429.

* cited by examiner

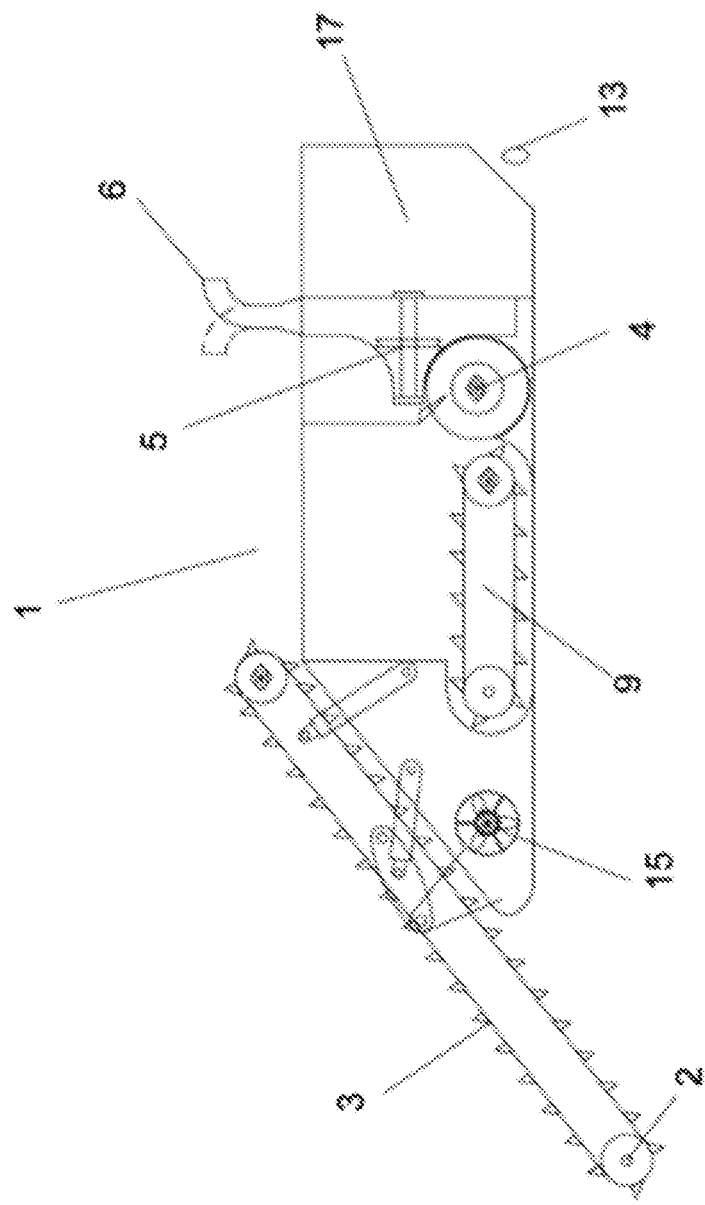

VESSEL FOR CLEANING WASTE IN SHALLOW WATERS

CROSS-REFERENCE TO RELATED APPLICATIONS

This application is a U.S. National Phase application, under 35 U.S.C. § 371, of International Application no. PCT/ES2018/070429, with an international filing date of Jun. 18, 2018, and claims benefit of Spanish Application no. U201730731 filed on Jun. 19, 2017, each of which are hereby incorporated by reference for all purposes.

BACKGROUND OF THE INVENTION

1. Field of the Invention

The object of the present invention is a boat particularly conceived for the extraction and collection of branches, trunks, or even trees and any aquatic plant for grinding them to the desired size and casting it in any direction, placing them on the bank of the watercourse or returning them to the watercourse. The collection of suspended waste such as plastics or papers for suitable classification and treatment is also an object of the boat.

The present invention belongs to the sector of the art relating to boats implementing a plurality of tools to provide maintenance service for rivers, canals, lakes, and coastal areas, and generally in any zone or region of shallow water; it can also store the suspended waste until it is evacuated on land. The present invention is also useful in the collection of products in lacustrine crops for food and/or medicinal uses in shallow water.

2. Background

There are several solutions devised for removing plant remains, cutting the plants and other plant waste such that shallow rivers, lakes, canals, and coastal areas can be kept clean. An example can be found in document WO2012/101304. Nevertheless, boats of this type are not practical in shallow water (less than 70 cm deep), making them unviable for certain watercourses and uses since they can destroy the vegetation of lacustrine crops grown there.

There are also known in the state of the art small-sized boats with a directional propeller and with forward-backward reversible flow which can have arranged in its front part, by quick coupling, various tools for cutting grasses, reeds, algae, or other species, and subsequently decoupling this tool and assembling a rake that collects the cut materials, discharging the waste wherever possible.

These boats can have coupled thereto an articulated side arm on which a saw is assembled. The main technical problem with said boats is that they have very little work capacity. First they have to cut, then collect, and after several maneuvers, move to deposit the algae, reeds, or other plants collected to a point on the shore, where they will be have to be removed to prevent their rotting from generating an insalubrious focal point, with the troubles this may cause in sensitive ecological areas.

Another way that is used to clean shallow water is to employ excavators with an articulated arm and net bucket operated from the shore. The drawbacks can be summarized in that their use is limited to a strip of not more than two meters from the shore, and it is necessary to later remove the remains to avoid generating an insalubrious focal point, like in the process described above. Generally, to avoid these insalubrious focal points, it is necessary to also use equipment for removing extracted plant waste by means of trucks or trailers which take the algae and other plants to the dump and grinding equipment which grind them and turn them into organic fertilizer after their decomposition and on land.

Boats which cut and bring up algae and other species into said boats, then transferring same once the boat is filled into another boat or taking same to a discharge point are known. These are generally average-sized boats (about five meters long) which have at their front part a horizontal saw which is submerged at the discretion of the operator, cutting the plants. Sometimes they may have a vertical saw from each vertex of the horizontal saw which serves for cutting plants in the vertical direction given that they are generally all mixed together, thereby facilitating their extraction. They also serve for collecting waste such as suspended papers and plastics.

Subsequently, there is arranged a perforated conveyor belt which lifts up the plants that have been cut and those that are suspended, dumping them into the boat. In these boats, there are some which only store the plants on deck, and there are others which have a moving floor which serves to enable storing and subsequently discharging a larger amount.

The main drawback of the aforementioned boats in their use in lakes for aquatic crops is their draft since they damage and destroy aquatic crops when they work in said areas, given that once the boat is completely loaded, it has to get to shore and discharge there, jeopardizing plant growth in its transit.

There are also boats which grind the plants in situ, leaving the remains on the surface. These boats have associated thereto rotors which are generally moved hydraulically, equipped with fragmenting blades the function of which is to chop up and grind the aquatic plants that are on the surface. As a main drawback, it should be mentioned that they are tools only for very weak plants, and it is also impossible to achieve uniform grinding of the remains to generate small pieces of plant remains or wood where the plants are trunks. Therefore, it generates average- and large-sized pieces of plant which foul the surface of the lake or canal and are driven by the current, being deposited in backwaters and floodgates, with the troubles and drawbacks this generates. Furthermore, if one of those pieces travels with the current and takes root somewhere else, the extent of the invasive species increases, with the damage this may cause.

Likewise, energy use is quite inefficient given that most of the power is used to drive the cutting blades and not to cut and fragment the plant remains, but rather in agitating and stirring up the water.

Finally, it should be indicated that there is no known boat today with a small draft which establishes a method of collecting and harvesting cultivated plants on the surface of shallow lakes, and which furthermore does so in an efficient manner, with a high harvest capacity in terms of number of tons/hour without damaging the crops planted there, or collecting and classifying the pollutant waste such as papers or plastics.

Another need which has been detected in the current state of the art and which has not been efficiently resolved to date is the removal of branches, trunks, or even trees which have been entrained in floods into lakes or dams intended for the regulation of drainage basins in the headwater of rivers.

These entrainments occur during rainy or snow melt seasons, and it causes the levels of dams to change considerably, so it is very difficult to find an access zone to deposit, with a boat, these branches, trunks, or trees which need to be disposed of so as not to obstruct the outlet floodgates or water turbines generating electricity.

Up until now, there has not been a suitable boat capable of collecting branches, trunks, or even trees and breaking them into small wood chips that do not complicate the opening and closing of floodgates or the normal operation of the water turbines for generating electric current.

SUMMARY OF THE INVENTION

An object of the present invention is a device which solves the technical problems described in the state of the art, such that a single boat offers an integral solution to the drawbacks of removing plant waste, that is, branches, trunks, or trees, and other solid pollutant waste that may be suspended in the aquatic medium, as well as an efficient technical solution for the maintenance and conservation of rivers, canals, lakes, and in general, shallow water.

More specifically, the present invention is a boat which cuts the plant remains, extracts them, grinds them into small fragments, and casts them, by itself, to a side of the canal or dam, where they can be evacuated mixed with water through a tube onto land so that they can be filtered there for their subsequent treatment and recycling or for being cast back into the water once they have been cut up into very small fragments, where the size of the ground material may vary at the discretion of the operator, and no longer represent a visual or landscape annoyance, or interfere with or hinder the opening of the floodgates. Another advantage is that they prevent malfunctions in the dam outlet water turbines, even having an articulated arm supporting, by means of a winch and a steel towline to which the electrical connections are attached, hydraulic tubes for remotely operating a suspended grapple provided with a camera for viewing the obstructing object, with small motor-powered propellers to facilitate maneuverability and directionality if it were necessary to catch and allow extracting a trunk obstructing the floodgate or water turbine, and subsequently raising it up to the surface and finally grinding it on the boat.

Another beneficial effect of the use of the present boat is that by extracting and grinding outside of the bed of water, the plants lose their reproductive capacity or it slows down since they are finally cut up in the growth stage before they can reproduce and produce fruits, which is what occurs in most aquatic species.

Therefore, the present invention is conceived for servicing rivers and canals with water where there is a continuous current, and where, furthermore, there are complications for maneuvering with a ship in 180° turns. All this is the result of the boat according to claim 1 attached to the present specification. The dependent claims describe particular embodiments of the boat object of the present invention.

Additionally, the present invention has demonstrated its usefulness in zones with aquatic crops for harvesting and utilizing said crops.

In a particular and non-limiting interpretation, given that the mentioned boat is intended for working in very vulnerable ecosystems, for the purpose of preserving the water in canals and lakes where it is operating, and for the purpose of preventing possible leaks of contaminant fluids due to the breakage or rupture of any of the systems involved, such as the heat engine with its cooling system, hydraulic pumps, hydraulic distributors, and electric batteries that will be located in a single compartment which will optionally have a double hull both at the bottom and on the sides. In the lower part there will be a bilge pump which, controlled by a level probe, begins operating when it detects that any of the fluids of the different systems is being lost, driving the mentioned fluid to the fully pressurized emergency waste receptacle that has the capacity to hold all the fluids of two different systems, such that when the bilge pump starts operating, the operator of the boat will be notified by means of an acoustic signal and another sound signal in the operator control panel.

Likewise, if a hydraulic hose were to break, since all of them are encapsulated within another one having a larger diameter, even though it is at low pressure, the hydraulic fluid would be collected if there were a leak.

Each of these enveloping hoses will be connected at their lower point by another one having a smaller diameter and will form a drainage circuit which will be directed towards the lower point of the compartment containing the engine, the hydraulic pumps and distributors, and the battery so as to drain the leak there, with the drainage system operating as described above.

The mentioned bilge pump, in an optional and non-limiting manner, will have a system with a double engine configuration to assure its operation under any adverse circumstance.

Throughout the description and claims, the word "comprises" and its variants do not intend to exclude other technical features, additions, components, or steps. For those skilled in the art, other objects, advantages, and features of the invention will be inferred in part from the description and in part from putting the invention into practice. The following examples and drawings are provided by way of illustration and are not intended to limit the present invention. Furthermore, the present invention covers all the possible combinations of particular and preferred embodiments herein indicated.

BRIEF DESCRIPTION OF THE DRAWINGS

A series of drawings which help to better understand the invention and which are expressly related to an embodiment of said invention presented as a non-limiting example thereof are very briefly described below.

FIG. 1 shows a schematic drawing of the boat for cleaning plant waste in shallow water, object of the present invention.

DETAILED DESCRIPTION OF AN EMBODIMENT OF THE INVENTION

As can be observed in the attached FIGURES, in the present description of the different practical embodiments of the invention the following reference numbers have been used:

| | |
|---|---|
| 1: boat or ship | 2: front saw |
| 3: extractor belt | 4: grinding mill |
| 5: drive turbine | 6: directional stack |
| 9: horizontal conveyor belt | 13: propeller |
| 15: adjustable auxiliary front propeller | 17: diesel engine |

As can be observed in the attached FIGURES, the present invention consists of a boat (1) for servicing rivers, lakes, and canals, or, in general, shallow water, the object of which is to extract, by cutting if necessary, grind, and cast the vegetation or waste found in canals, and it comprises a front saw (2) cutting the plants below the surface of the water, said plant waste being extracted by an extractor belt (3) and subsequently driven to a mill (4) which grinds it, and then it is cast by a drive turbine (5) and directed by a directional stack (6) to the zone where it is to be deposited or scattered. It can also remove waste such as papers, plastics, and other suspended floating waste, grinding it and storing it in the boat itself in a hopper intended for such purpose, or mixed with water, driving it to land, where it will be collected and processed, being separated from the water, and even being extruded.

The usefulness of the present invention in harvesting crops in aquatic media for food, medicines, or energy should also be mentioned, because due to the small draft of the boat, it could be used without damaging the cultivation.

As indicated, the boat (1) consist in its front part of a support supporting a front saw (2) which, configured for cutting algae and other aquatic plants, can be raised and lowered from said front part of the boat (1) at the discretion of the operator to about a meter below the surface of the water.

Optionally, and in a non-limiting manner, this first front saw (2) may have associated at each of its side ends a second side saw configured for cutting and separating the plants which have been cut from those nearby, given that this facilitates their extraction after cutting them since they are all mixed together.

Optionally, for uses in canals where the dikes have a side inclination, the inclination of the side saws will be adjustable and can be assembled with an inclination similar to the slope of the lake or canal in which they are working. They likewise may be inclined at the discretion of the operator so that, with the side saw in its horizontal position, from the bottom, it can be as close as possible to the slope of the wall and thereby achieve the most precise cutting possible at the base of the plants.

Optionally, these fixed or inclined side saws may be replaced with several serrated cutting discs. The use of cutting discs instead of side saws is due to the presence of trees or bushes in the canal, such that their branches cannot be cut by saws with blades and it is more efficient to cut them by means of serrated discs.

These side saws or discs may be provided on their outer part with a support wheel such that they can be supported on the slope, thereby considerably increasing the stability of the boat.

In an optional and non-limiting manner, the mentioned boat may be provided with a grinding head driven by a motor located on an adjustable telescopic support which may rotate 360° with respect to the longitudinal axis and have the purpose of grinding and absorbing, casting off branches or bushes which may be located on the slopes or branches hanging from the trees located in the shore, suctioning up the remains and sending them to the grinding mill to be effectively ground and processed according to the possibilities of the boat described above.

After the cutter bars and on the support there is an extractor belt (3) for extracting the plant waste which is raised and lowered at the discretion of the operator. This extractor belt (3) is formed by a body supporting two rollers, a lower roller and another upper roller. The extractor belt (3) must be made of a very strong material, such as KEVLAR®, and have holes in order to evacuate the water, or it is formed by two chains (one on each side) with metallic sections with perforations screwed to each chain to facilitate replacement should they become deformed when collecting trunks, or by several longitudinal elastic bands which serve as support for transverse crosspieces to facilitate the extraction of algae or solid waste suspended in the water that has previously been cut.

Since the mentioned extractor belt (3) can be raised or lowered from the rear part, it enables the boat (1) to vary its height, lowering its upper point, and to more easily pass under bridges where the water is very close to the obstacle.

In a particular embodiment, this support will have in its front part caterpillar tracks which will serve as support and drive by means of an engine to enable being supported and even moving, while supported on same. These caterpillar tracks are driven by means of an engine and are directional by means of one cylinder for each track.

In an optional and non-limiting manner, the mentioned boat may have driven caterpillar tracks in its rear part, one on each side, which can move up and down and be directed to facilitate movement in very shallow zones, or even on land, in combination with the front caterpillar tracks.

In a particular embodiment, in the rear upper part, the plant extractor belt (3) has a pre-grinder cylinder which will break up the plants so that they take on a smaller size and are subsequently more readily ground.

The plants that are collected will fall onto the horizontal conveyor belt (9), which takes the collected plant remains to the grinding mill (4), which grinds and fragments the plant waste through the action of a rotor which rotates from below and above (non-limiting) and may have fixed or moving blades or hammers, according to the selection made by the operator based on the plant remains in the work area and the convenience of using certain types of cutting tools or others. In its upper casing, it may optionally have fixed hammers to aid in fragmenting the plant remains. This grinding mill (4) will optionally dump the material through a sorting screen, which will be interchangeable and therefore will have holes of different sizes to thus obtain different grinding gauges.

This plant waste goes through the mentioned metering screen into the accelerating turbine (5) which collects the material cut up by the grinding mill (4), suctioning it up and casting it towards the directional stack (6) by means of driving fins. It may have in its upper part an interchangeable screen, where the latter may have openings of a different gauge which prevents fragments the size of which is greater than the chosen gauge from passing through and reaching the turbine until they are fragmented.

These remains that have gone through the sorting screen are cast by the accelerating turbine and driven by the height-adjustable directional discharge stack (6) so that, by being able to rotate 360 degrees and being able to orient the flow on both sides of the boat (1) and backwards, upwards and downwards, such remains can be cast to the desired discharge area. The movements of the flow are operated by electric actuators or hydraulic motors associated with a reduction gear for rotation and by a hydraulic cylinder for the discharge height.

In a non-limiting interpretation, the mentioned boat (1) may have a second drive turbine that will send an additional airflow to the directional stack (6) so that the discharged remains can be cast as far as possible, if the working procedures require this.

In a particular and non-limiting interpretation, there can be connected to the directional discharge stack (6) a very long discharge tube which has floating rings and allows discharging at a point on the shore, regardless of how far away it is. Said tube may have at the opposite end (on land) a suction turbine to facilitate the transit and ejection of the ground remains coming from the boat (1) for use for agricultural or medicinal purposes.

In a particular interpretation, the mentioned boat may have a storage hopper for contaminating waste (i.e. plastics, papers, cans) which can be collected in this manner, directing the discharge stack there, and when collected by the boat, they may be driven there to decontaminate the river or lagoon for later recycling for the sake of improving and protecting the aquatic ecosystem.

In a particular embodiment, water is added to the waste storage hopper, at the discretion of the operator, by means of a pump which will suction the water from the canal or lake where it is working, and another pump will collect the suspended plant remains mixed with water from this collection tank to be pumped through a floating tube going from the boat to shore, and there they will be dumped into a screen where the suspended plant remains will be separated from the water, dumping the water back into the canal or lagoon and the ground remains being separated for processing and recycling, and they can even be extruded to lower their water concentration, thus facilitating later transport and recovery.

In a non-limiting manner, the boat (1) of the present invention may be of the type with a hull made of steel plate, formed by different cells which can all be flooded at the discretion of the operator in order to change the draft of the boat (1) or to improve its stability such that, by completely flooding them, the boat (1) is submerged almost in its entirety so that it can pass under bridges with a lower edge very close to the level of the bed.

Said cells will be flooded by means of opening several opening located in their upper part and emptied by the action of pressurized air entering each of the cells through their upper part. Said cells will have an opening safety valve at 3 kg (adjustable) so that when pressurized air enters, it opens the valve and pushes the water out; the cells are emptied and, therefore, the boat surfaces.

The mentioned cells will be distributed (in a non-limiting manner) as follows: one in the front part, another in the rear part, and two on each side. In this manner, when one of the cells is flooded, the boat (1) can be countered weighted on the opposite side and horizontally balanced. For example, if the extractor belt (3) which goes in the front part is removed, the rear cell will be flooded.

The operation of the grinding mill (4) and the drive turbine (5) can be driven by two fixed or variable flow hydraulic motors, or it can receive the force for rotation through belts coming from the motor and by clutches and gearboxes transmitting them.

The main propulsion and steering is by means of a propeller (13), which may be assembled on a raisable support which rotates 90° to the right and left. Said engine rotates in both directions so that the boat (1) can move forwards or backwards.

In an optional and non-limiting manner, the boat (1) can have a second propeller so that, in case of emergency, it can approach the shore and overcome the current of the waterway or river if the engine or main propeller were to malfunction. The boat can have an auxiliary motor of the type known as an outboard motor.

In an optional and non-limiting manner, the front floodable cell can furthermore have an integrated hollow tube going through it from side to side, inside which there will be an auxiliary front directional propeller (15) when, by rotating in one direction or the other, allows steering the front part of the boat with two water flows, a suction flow and a drive flow, which aids in sharp turns and in maneuvering of the rear directional propeller and minimizes the creation of large lateral currents that damage the slopes of the canal. Even the combined action of this front directional propeller and the rear propeller allows the boat to move obliquely with respect to the slope to enable a more suitable cutting in certain circumstances.

The boat (1) comprises a diesel engine (17) which, through hydraulic and/or electric means, conventionally provides all the energy needed for the normal performance of the functions of the boat (1). Nevertheless, in an optional and non-limiting manner, this boat may not have an engine itself and may receive power from an external engine on land which moves one or more pumps attached by means of tubes to the discharge tube and providing power to all the elements of the boat in the hydraulic distributors located on the boat, with radio frequency means, which will be attached to the cut-up waste extractor tube and hydraulic tubes.

All the functions of the mentioned boat (1) may be operated by radio control from the shore up to a distance of 50 meters.

The boat (1) optionally comprises radio frequency control means, such that it can be remotely operated and wirelessly connected, with the system being capable of establishing work areas, restricted areas, and routes of passage, as if it were a drone. In the same manner, the boat (1) comprises GPS geolocation means which monitor its current position and past positions and set the power consumption necessary for the extraction and grinding of the waste or crops in precise coordinates, thereby allow it to perform periodic follow-up on the development of algae populations in the zones where control thereof is required. The path may be predetermined to pass next to the edge of where it has previously passed, or to not access zones that are of limited access, such as shores of rivers or lakes or certain infrastructures or pre-established work areas, all while taking in real time the coordinates where it is located and acting on and controlling the valves which control the driving and directional turbines of the mentioned boat.

In a particular interpretation, the control cab may be arranged anywhere on the deck of the boat where the different controls and control elements for operating the boat and their accessories will be located. The control cab will be in a raised cabin on deck, above the horizontal conveyor belt. Optionally, this cabin may be closed, pressurized, and hermetic. It may be raised or lowered at the discretion of the driver, and it can be introduced into the compartment where the horizontal conveyor belt is housed, with only about twenty centimeters of it projecting, for the purpose of flooding the cells of the hull, submerging the boat almost entirely, stopping the diesel engine to navigate in electric power mode, and pass under bridges the underside of which is close to the surface of the water of the river bed, even touching it only to emerge again. As described above, the boat will pressurize each of the floodable cells with air and the relief valves will open, with the water serving as ballast flowing out and the boat surfacing to the level desired by the operator to continue with the work.

In an optional and non-limiting manner, the mentioned boat (1) may have in its rear part two telescopic stabilizing legs having two or three sections, which in the standby position are assembled longitudinally on the hull and secured by a pivoting journal to the lower rear vertex, pivoting 90 degrees by means of two cylinders, and when the sections forming them are rotated and moved with respect to one another, they serve for being fixed to the bed of the canal, allowing the boat not to be driven by the current of the river or canal or allowing the boat to move forward on dry terrain (land). The upper side of these stabilizing legs will not surpass the highest point of the boat in their folded position.

The boat (1) may have on its left front part (in a non-limiting manner) an articulated rotating arm carrying tools, which may be telescopic in some sections, which allows stabilizing the boat (1), being lowered and touching the ground and joining in this position and in coordination with the telescopic stabilizing legs assembled in the rear part, allowing movement in places where there is an insufficient volume of flow or even on land.

The folded-standby position of this articulated telescopic arm does not surpass in height the highest point of the boat. The mentioned articulated arm may rotate 360 degrees and will be able to have at its end: a) an excavation bucket; b) a suspended and directional grapple type bucket with a viewing camera attached to and suspended from a steel cable connected to a hydraulically windable winch; c) a mud and sludge suction pump to enable dredging sediments deposited on the bottom of the canal, and it can also be suspended from a winch and provided with a viewing camera; d) a jack hammer to enable driving in stakes, retaining panels or posts; e) saws; f) trimming heads; or g) opening and closing scissors of the many types in existence.

The telescopic stabilizing legs can be assembled in the front part of the boat (1), one on each side, without surpassing the foremost point of the boat or the highest point of the boat either. In this case, the articulated arm will be assembled in its central rear part and may rotate 360 degrees. The mentioned boat may have two extendable and pivoting stabilizing legs located in its rear part and on both sides, located slightly ahead of the center of rotation of the articulated arm.

These extendable and pivoting stabilizing legs will rotate from front to back, such that in their point of backwards rotation each of them is aligned with the end side of the boat (1) in which it is assembled, and from which each one projects, rotating forwards to the end of the leg and being lowered three meters from the lowest point of the hull, reaching halfway, therefore rotating 120 degrees. Said extendable and pivoting stabilizing legs are operated by cylinders for moving the outer tip up and down to have a larger or smaller range and to rotate forwards-backwards, which thus facilitates supporting the weight of the boat (1) in the point of the ground which best stabilizes the boat, or being able to move with the synchronized movement of the two legs assembled in the front part with the extendable and pivoting stabilizing legs and with the aid of the articulated arm.

The articulated rotating arm together with the two extendable and pivoting stabilizing legs may be assembled in the rear part of the boat in a body boltable at fixing points, therefore being removable.

The height of this body will be ⅕ the length of the boat, less than the hull of the boat (1) to facilitate the passage of the water flow coming from the propellers and thereby enabling and facilitating the thrust they perform. It may also optionally have two hollow tubes which are inserted into the openings where the propellers are housed in order to thus become a prolongation, and the flow of water which serves to propel the boat is transmitted to the rear vertex of the mentioned boat.

A boltable floating section with a hollow hull and moving floor may be attached at hull fixing points to enable storing ground plant remains such that when the boat is located a distance from the shore that the ejection stack cannot reach, they can be stored in this boltable section, and (the assembly) formed by the collecting-grinding boat and the boltable section can have autonomy to collect algae or plant remains and dump them on shore or in an auxiliary boat to be transported to shore. The hull of this floating boltable section will be made up of floodable cells, which will be ballasted when it is not supporting any load. By means of the discharge valves, ballast will be lost so that when a load of plant remains is being supported, it will maintain the same flotation level. In its bottom, this boltable section will have a horizontal belt which, in its rear part, will be raised up and the stored material dumped at a greater height about two meters away from the rear edge of the boat (1).

The invention claimed is:

1. A boat (1) for servicing shallow waters configured for extracting, cutting, grinding, and casting off plant waste comprising:
    a front saw (2) configured for cutting plants below the shallow water surface, wherein the front saw (2) can be raised and lowered from a front part of the boat (1) to about a meter below the shallow water surface; and
    an extractor belt (3) configured for extracting plant waste previously cut by the front saw (2) which is deposited on a horizontal conveyor belt (9) to a grinding mill (4), wherein the extractor belt (3) is formed by a body supporting two rollers, a lower roller and an upper roller; and wherein the extractor belt is configured for being raised and lowered;
    wherein the grinding mill (4) is arranged to grind and fragment the plant waste received from the horizontal conveyor belt (9) through the action of a rotor;
    and wherein the grinded and fragmented plant waste is collected into a drive turbine (5) which is arranged to suction and cast the grinded and fragmented plant waste towards a height-adjustable stack (6) able to rotate 360° to a zone where the grinded and fragmented plant waste is to be deposited.

2. The boat (1) according to claim 1, comprising radio frequency control means arranged to operate the boat (1) remotely and configured to establish work areas, restricted areas and automate paths.

3. The boat (1) according to claim 1, comprising GPS geolocation means arranged to monitor a current position of the boat (1), past positions of the boat (1), and power consumption necessary for the extraction and grinding of the plant waste.

4. The boat (1) according to claim 1, wherein the front saw (2) can be raised and lowered from the front part of the boat (1) to about a meter below the shallow water surface at the discretion of an operator.

5. The boat (1) according to claim 1, wherein the extractor belt is configured for being raised and lowered at the discretion of an operator.

* * * * *